United States Patent
Sheh et al.

(10) Patent No.: US 8,498,076 B1
(45) Date of Patent: Jul. 30, 2013

(54) DISK DRIVE BIASING TIMING RECOVERY MEASUREMENTS FOR SPIRAL TRACKS BASED ON RADIAL LOCATION OF HEAD

(75) Inventors: Edgar D. Sheh, San Jose, CA (US); Yakov M. Lifchits, San Jose, CA (US); Charles A. Park, Aromas, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 758 days.

(21) Appl. No.: 12/765,620

(22) Filed: Apr. 22, 2010

(51) Int. Cl.
*G11B 21/02* (2006.01)
(52) U.S. Cl.
USPC .............................................. 360/75; 360/51
(58) Field of Classification Search
None
See application file for complete search history.

(56) References Cited

U.S. PATENT DOCUMENTS

| | | | |
|---|---|---|---|
| 5,668,679 A | 9/1997 | Swearingen et al. | |
| 7,158,336 B2 * | 1/2007 | Chan et al. | 360/77.05 |
| 7,212,364 B1 | 5/2007 | Lee | |
| 7,391,583 B1 | 6/2008 | Sheh et al. | |
| 7,391,584 B1 | 6/2008 | Sheh et al. | |
| 7,411,758 B1 | 8/2008 | Cheung et al. | |
| 7,532,424 B2 | 5/2009 | Sai et al. | |
| 7,551,387 B2 * | 6/2009 | Sun et al. | 360/75 |
| 7,561,359 B1 | 7/2009 | Jeong et al. | |
| 7,567,404 B1 | 7/2009 | Rutherford et al. | |
| 7,639,446 B2 * | 12/2009 | Mizukoshi et al. | 360/75 |
| 7,656,604 B1 | 2/2010 | Liang et al. | |
| 7,667,911 B2 | 2/2010 | Lau | |
| 7,675,702 B2 * | 3/2010 | Watt et al. | 360/75 |
| 7,773,334 B1 * | 8/2010 | Rutherford | 360/75 |
| 7,839,591 B1 * | 11/2010 | Weerasooriya et al. | 360/51 |
| 7,859,782 B1 * | 12/2010 | Lee | 360/51 |
| 7,881,005 B1 * | 2/2011 | Cheung et al. | 360/75 |
| 2007/0195445 A1 | 8/2007 | Vanlaanen et al. | |
| 2008/0239556 A1* | 10/2008 | Wiseman et al. | 360/77.08 |
| 2009/0086357 A1 | 4/2009 | Ehrlich | |

* cited by examiner

*Primary Examiner* — Hoa T Nguyen
*Assistant Examiner* — James L Habermehl (57) ABSTRACT

In an embodiment of the present invention, a disk drive comprises a head actuated over a disk including a plurality of spiral tracks, wherein each spiral track comprises a high frequency signal interrupted at a predetermined interval by a sync mark. The read signal from the head is processed to detect a plurality of the sync marks in spiral track crossings. A plurality of timing recovery measurements are generated corresponding to the detected sync marks, and the timing recovery measurements are biased based on a radial location of the head. A servo write clock is generated in response to the biased timing recovery measurements, and the servo write clock is used to write product servo sectors to the disk.

20 Claims, 14 Drawing Sheets

DISK DRIVE BIASING TIMING RECOVERY MEASUREMENTS FOR SPIRAL TRACKS BASED ON RADIAL LOCATION OF HEAD

BACKGROUND

Figure 1:
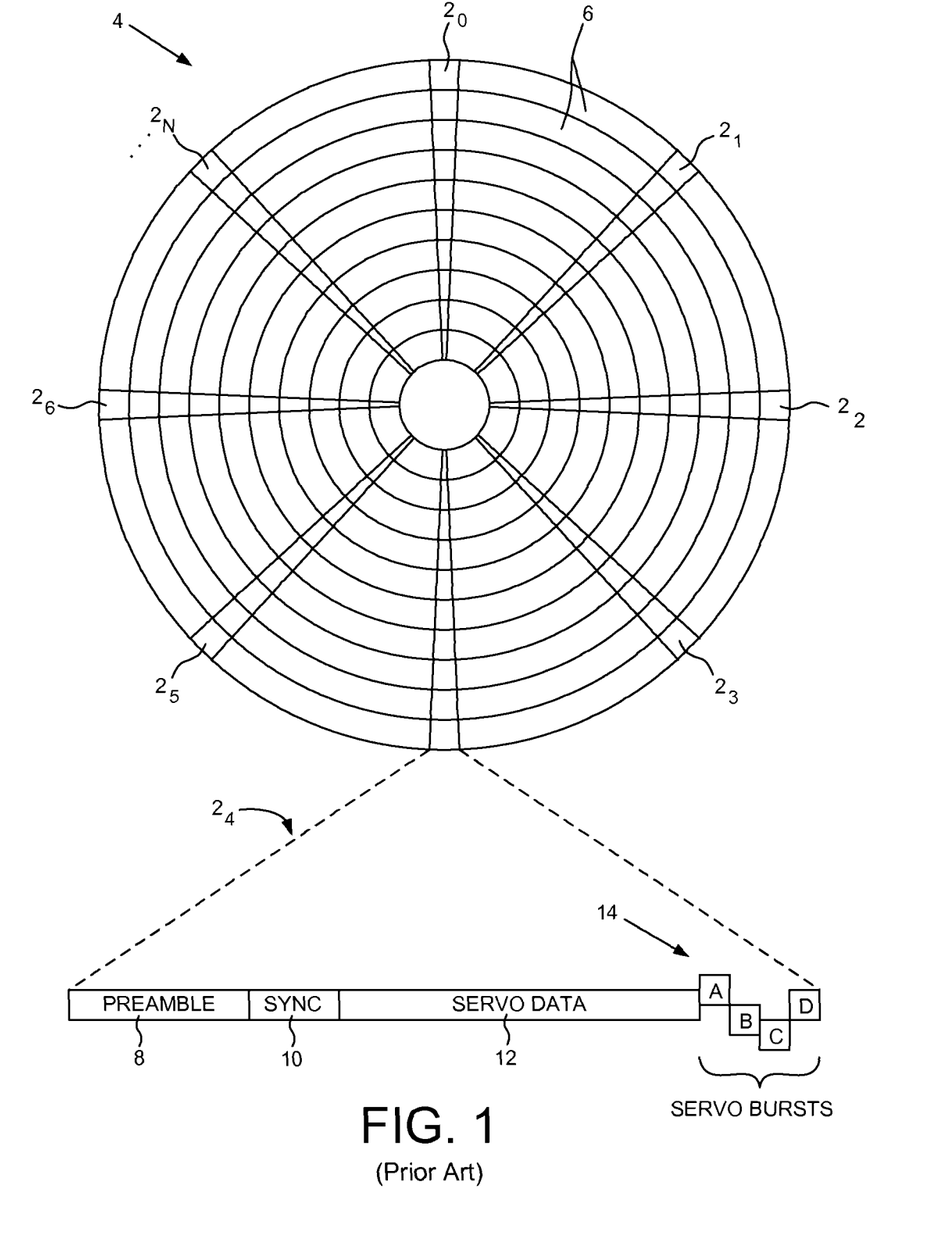
FIG. 1 shows a prior art disk format comprising a plurality of radially spaced, concentric tracks defined by a plurality of product servo sectors.

When manufacturing a disk drive, concentric servo sectors $2_0$-$2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0$-$2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

DETAILED DESCRIPTION OF EMBODIMENTS OF THE INVENTION

In an embodiment of the present invention, a disk drive comprises a head actuated over a disk including a plurality of spiral tracks, wherein each spiral track comprises a high frequency signal interrupted at a predetermined interval by a sync mark. The read signal from the head is processed to detect a plurality of the sync marks in spiral track crossings. A plurality of timing recovery measurements are generated corresponding to the detected sync marks, and the timing recovery measurements are biased based on a radial location of the head. A servo write clock is generated in response to the biased timing recovery measurements, and the servo write clock is used to write product servo sectors to the disk.

Figure 2A:
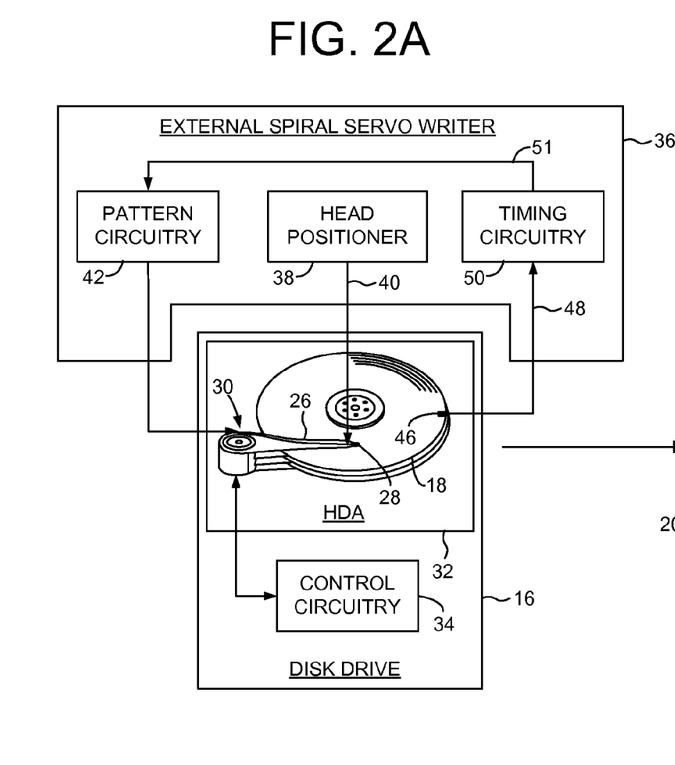
FIGS. 2A and 2B illustrate an embodiment of the present invention wherein an external spiral servo writer is used to write a plurality of spiral tracks to the disk for use in writing product servo sectors to the disk.
Figure 2B:
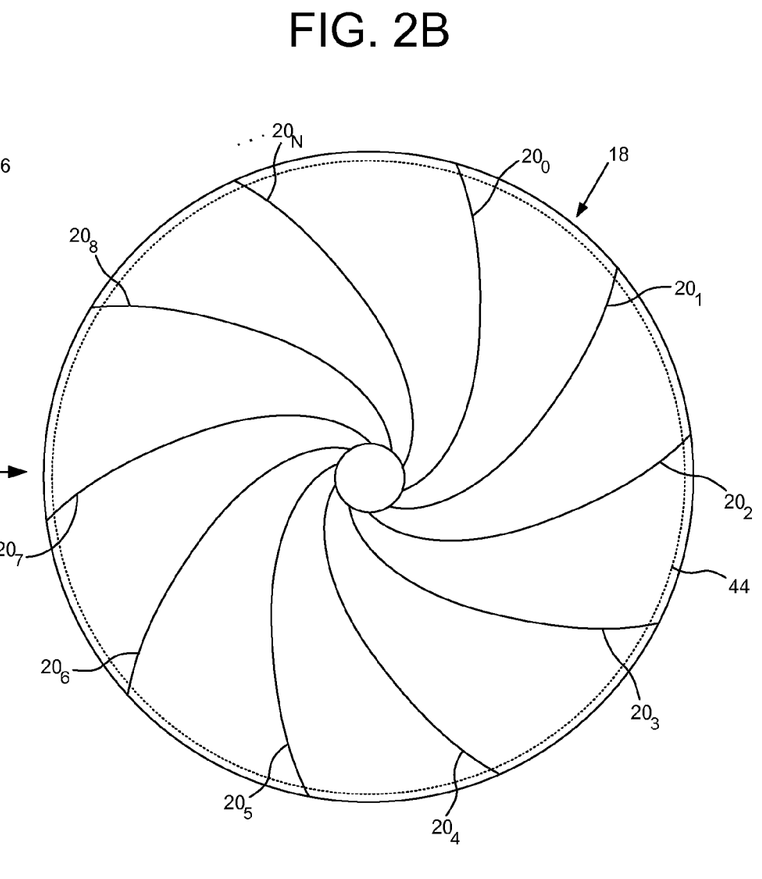

The spiral tracks may comprise any suitable pattern and may be written to the disk using any suitable technique, such as using an external writer for writing the spiral tracks to the disk, or stamping the spiral tracks on the disk using magnetic printing techniques. FIGS. 2A and 2B show an embodiment wherein a plurality of spiral tracks $20_0$-$20_N$ are written to a disk 18 of a disk drive 16 using an external spiral servo writer 36. The disk drive 16 comprises control circuitry 34 and a head disk assembly (HDA) 32 comprising the disk 18, an actuator arm 26, a head 28 coupled to a distal end of the actuator arm 26, and a voice coil motor 30 for rotating the actuator arm 26 about a pivot to position the head 28 radially over the disk 18. A write clock is synchronized to the rotation of the disk 18, and the plurality of spiral tracks $20_0$-$20_N$ are written on the disk 18 at a predetermined circular location determined from the write clock. Each spiral track 20, comprises a high frequency signal 22 (FIG. 4B) interrupted at a predetermined interval by a sync mark 24.

The external spiral servo writer 36 comprises a head positioner 38 for actuating a head positioning pin 40 using sensitive positioning circuitry, such as a laser interferometer. Pattern circuitry 42 generates the data sequence written to the disk 18 for the spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize the write clock 51 for writing the spiral tracks $20_0$-$20_N$ to the disk 18. The timing recovery circuitry 50 enables the pattern circuitry 42 at the appropriate time relative to the write clock 51 so that the spiral tracks $20_0$-$20_N$ are written at the appropriate circular location. The timing recovery circuitry 50 also enables the pattern circuitry 42 relative to the write clock 51 to write the sync marks 24 (FIG. 4B) within the spiral tracks $20_0$-$20_N$ at the same circular location from the outer diameter to the inner diameter of the disk 18. As described below with reference to FIG. 5, the constant interval between sync marks 24 (independent of the radial location of the head 28) enables the servo write clock to maintain synchronization while writing the product servo sectors to the disk.

Figure 3:
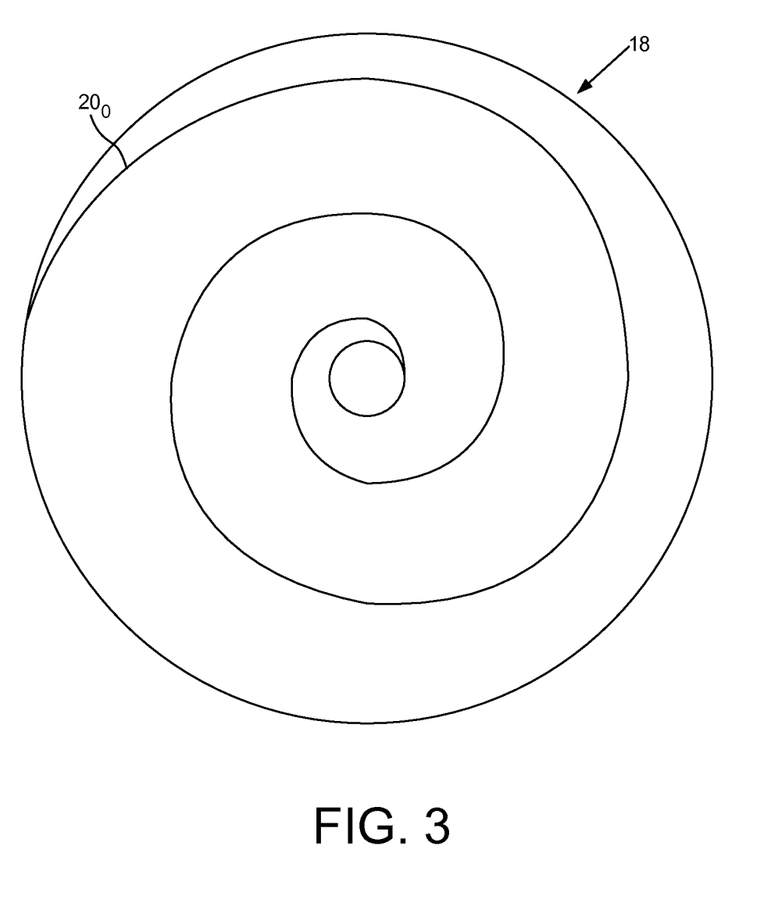
FIG. 3 illustrates an embodiment of the present invention wherein each spiral track is written over multiple revolutions of the disk.

In the embodiment of FIG. 2B, each spiral track 20, is written over a partial revolution of the disk 18. In an alternative embodiment, each spiral track 20, is written over one or more revolutions of the disk 18. FIG. 3 shows an embodiment wherein each spiral track 20, is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the spiral tracks $20_0$-$20_N$ to a number of disks 18, and one or more of the disks 18 are then inserted into an HDA 32.

Referring again to the embodiment of FIG. 2A, after the external spiral servo writer 36 writes the spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the spiral tracks $20_0$-$20_N$ in order to write the product servo sectors to the disk 18. In an alternative embodiment described below with reference to FIGS. 10 and 11, an external product servo writer is used to process the spiral tracks $20_0$-$20_N$ in order to write the product servo sectors to the disk 18 during a "fill operation".

Figure 4A:
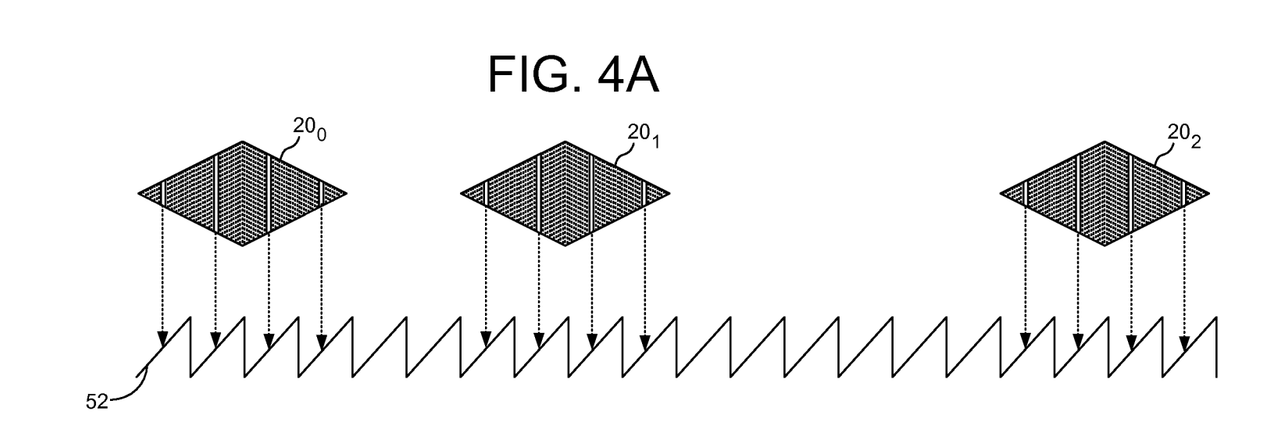
FIG. 4A shows an embodiment of the present invention wherein a servo write clock is synchronized by clocking a modulo-N counter relative to when the sync marks in the spiral tracks are detected.
Figure 4B:
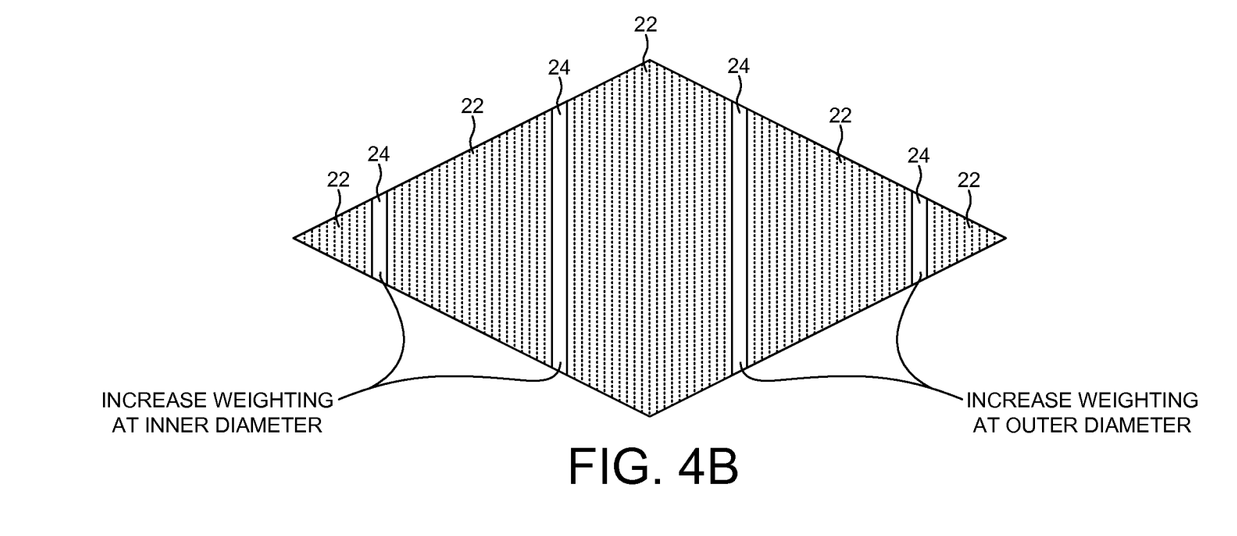
FIG. 4B shows an eye pattern generated by reading the spiral track, including the sync marks in the spiral track.

FIG. 4B illustrates an "eye" pattern in the read signal that is generated when the head 28 crosses over a spiral track 20.

The read signal representing the spiral track comprises high frequency transitions 22 interrupted by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

FIG. 4A shows an embodiment of the present invention wherein a saw-tooth waveform 52 is generated by clocking a modulo-N counter with the servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the spiral tracks $20_0$-$20_N$ is detected, the value of the modulo-N counter represents the phase error for adjusting the PLL.

In various embodiments described below, the timing recovery measurements used to synchronize the servo write clock are biased based on the radial location of the head. For example, when writing and/or when reading the spiral tracks $20_0$-$20_N$ the skew angle of the head changes as it moves from the outer diameter to inner diameter of the disk which may affect the quality of the sync marks. In an embodiment illustrated in FIG. 4B, when the head is located over an inner diameter of the disk, the early sync marks in a spiral track crossing may generate a more reliable timing recovery measurement, and when the head is located over an outer diameter of the disk, the later sync marks in a spiral track crossing may generate a more reliable timing recovery measurement. Therefore, in one embodiment the timing recovery measurements are biased based on the radial location of the head when synchronizing the servo write clock.

The biasing of the sync marks may vary depending on the geometry of the head or the radial direction that the spiral tracks are written. For example, in the embodiment of FIG. 4B biasing toward the early sync marks at the inner diameter and the later sync marks at the outer diameter may help if the spiral tracks are written from the outer diameter (OD) to the inner diameter (ID) of the disk. If the spiral tracks are written in the opposite direction (i.e., from the ID to OD), the biasing may be reversed such that the biasing may be toward the early sync marks when reading the spiral tracks at the outer diameter of the disk, and the biasing may be toward the later sync marks when reading the spiral tracks at the inner diameter of the disk.

The sync marks 24 in the spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the spiral tracks $20_0$-$20_N$ to be written to the disk 18 using a steeper slope (by moving the head faster from the outer diameter to the inner diameter of the disk 18) which reduces the time required to write each spiral track $20_0$-$20_N$.

In one embodiment, the servo write clock is further synchronized by generating a timing recovery measurement from the high frequency signal 22 between the sync marks 24 in the spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock.

Figure 5:
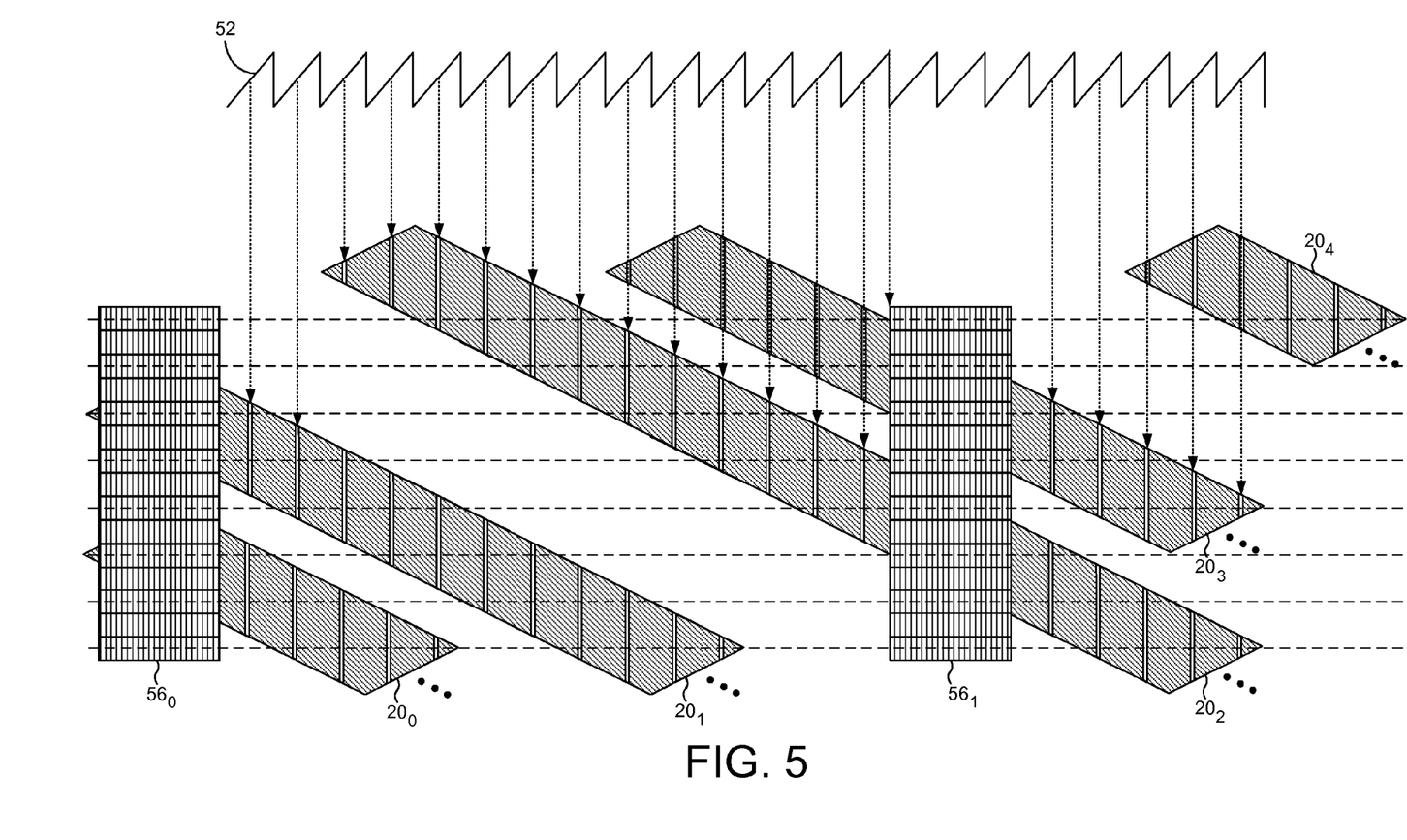
FIG. 5 illustrates writing of product servo sectors using a servo write clock generated from reading the spiral tracks.

FIG. 5 illustrates how the product servo sectors $56_0$-$56_N$ are written to the disk 18 after synchronizing the servo write clock in response to the high frequency signal 22 and the sync marks 24 in the spiral tracks $20_0$-$20_N$. In the embodiment of FIG. 5, the dashed lines represent the centerlines of the data tracks. The sync marks in the spiral tracks $20_0$-$20_N$ are written so that there is a shift of two sync marks 24 in the eye pattern (FIG. 4B) between data tracks. In an alternative embodiment, the sync marks 24 in the spiral tracks $20_0$-$20_N$ are written so that there is a shift of N sync marks in the eye pattern between data tracks. In the embodiment of FIG. 5, each spiral track $20_0$-$20_N$ is wider than a data track, however, in an alternative embodiment the width of each spiral track $20_0$-$20_N$ is less than or proximate the width of a data track.

The PES for maintaining the head 28 along a servo track (tracking) may be generated from the spiral tracks $20_0$-$20_N$ in any suitable manner. In one embodiment, the PES is generated by detecting the eye pattern in FIG. 4B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the spiral tracks are demodulated as servo bursts and the PES generated by comparing the servo bursts in a similar manner as the servo bursts 14 in the product servo sectors (FIG. 1).

Figure 6A:
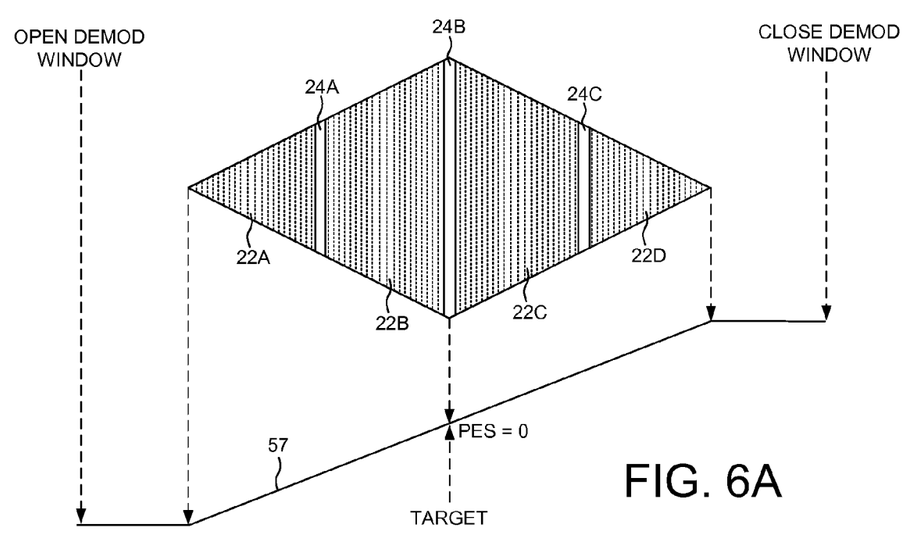
FIG. 6A illustrates an embodiment of the present invention wherein the high frequency signal in the spiral tracks is demodulated by integrating the read signal over a demodulation window and generating the PES relative to a target sync mark and a reference point on the resulting ramp signal.
Figure 6B:
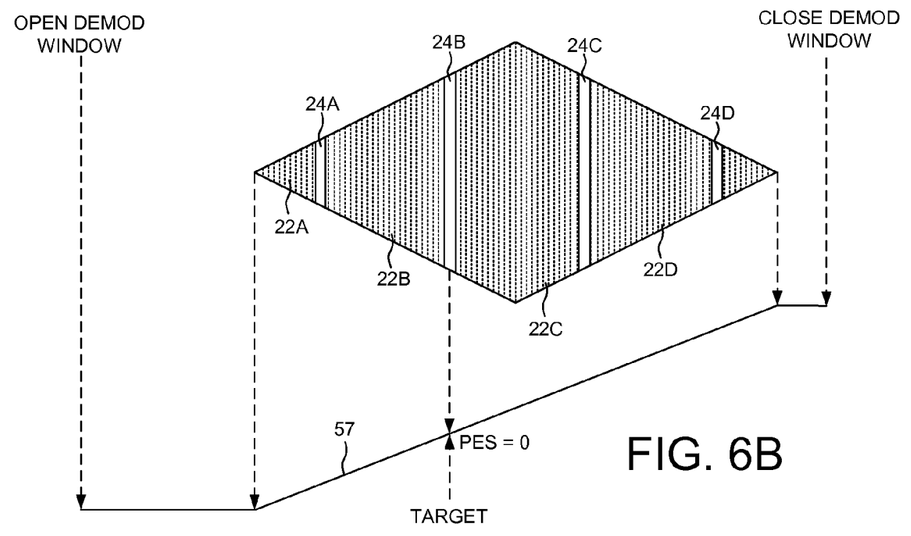
FIG. 6B illustrates initiating a seek operation by shifting the demodulation window an integer number of sync marks to generate a non-zero PES.

FIGS. 6A and 6B show an embodiment of the present invention for increasing the resolution of the track density when demodulating the high frequency signal in the spiral tracks to generate a ramp signal 57. FIG. 6A illustrates a tracking operation on a first servo track by generating the position error signal relative to a target sync mark 24B and a reference point of the ramp signal 57 (e.g., the center of the ramp signal 57), and FIG. 6B illustrates a seek to a next servo track by adjusting the reference point of the ramp signal 57. Note that the track density can be increased to essentially any resolution by appropriately adjusting the reference point of the ramp signal 57. Note also that the number of sync marks 24 in each spiral track crossing may vary depending on the target radial location of the head (e.g., three sync marks 24 in the spiral track crossing of FIG. 6A and four sync marks 24 in the spiral track crossing of FIG. 6B).

Once the head 28 is tracking on a servo track, the product servo sectors $56_0$-$56_N$ are written to the disk using the servo write clock. Write circuitry is enabled when the modulo-N counter reaches a predetermined value, wherein the servo write clock clocks the write circuitry to write the product servo sector 56 to the disk. The spiral tracks $20_0$-$20_N$ on the disk are processed in an interleaved manner to account for the product servo sectors $56_3$-$56_N$ overwriting a spiral track. For example, when writing the product servo sectors $56_1$ to the disk, spiral track $20_2$ is processed initially to generate the PES tracking error and the timing recovery measurement. When the product servo sectors $56_1$ begin to overwrite spiral track $20_2$, spiral track $20_3$ is processed to generate the PES tracking error and the timing recovery measurement.

Figure 7:
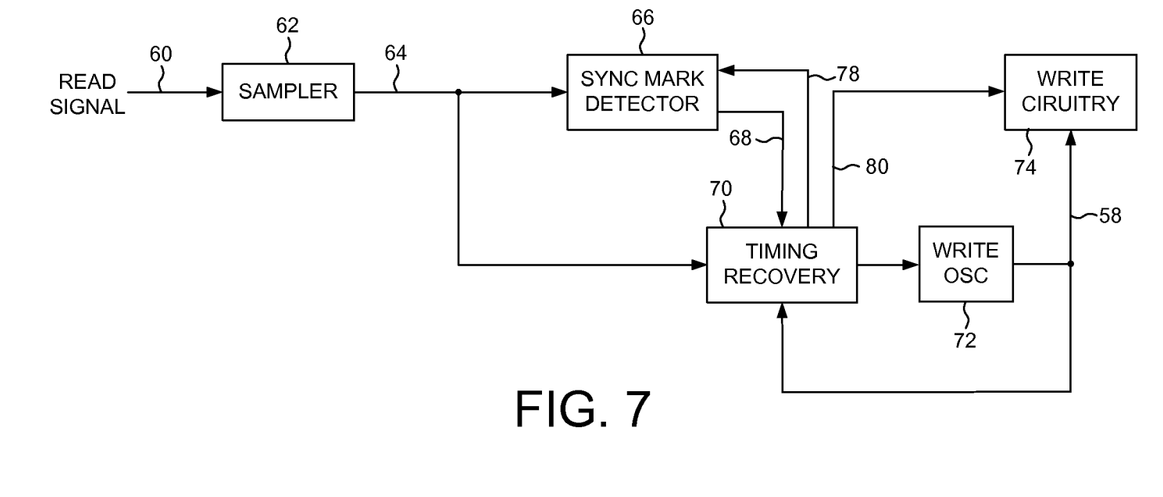
FIG. 7 shows control circuitry according to an embodiment of the present invention for generating the servo write clock.

FIG. 7 shows details of control circuitry for synchronizing the servo write clock 58 according to an embodiment of the present invention. The read signal 60 emanating from the head 28 is sampled 62, and the read signal sample values 64 are processed by a sync mark detector 66 for detecting the sync marks 24 in the spiral tracks $20_3$-$20_N$. The sync mark detector 66 generates a sync mark detect signal 68 applied to a timing recovery circuit 70. The timing recovery circuit 70 processes the sync mark detect signal 68 to generate a coarse timing recovery measurement, and the read signal sample values 64 representing the high frequency signal 22 in the spiral tracks $20_3$-$20_N$ to generate a fine timing recovery measurement. The coarse and fine timing recovery measurements are combined to generate a control signal applied to a write oscillator 72 which outputs the servo write clock 58. The servo write clock 58 clocks operation of write circuitry 74 for writing the product servo sectors $56_0$-$56_N$ to the disk 18. The servo write clock 58 is also fed back into the timing recovery circuit 70 and used to generate the coarse timing recovery measurement. The timing recovery circuit 70 generates a sync mark detection window over line 78 for enabling the sync mark detector 66 during a window where a sync mark 24 is expected to occur. The timing recovery circuit 70 also generates a control signal over line 80 to enable the write circuitry 74 to begin writing a product servo sector at the appropriate time.

Figure 8A:
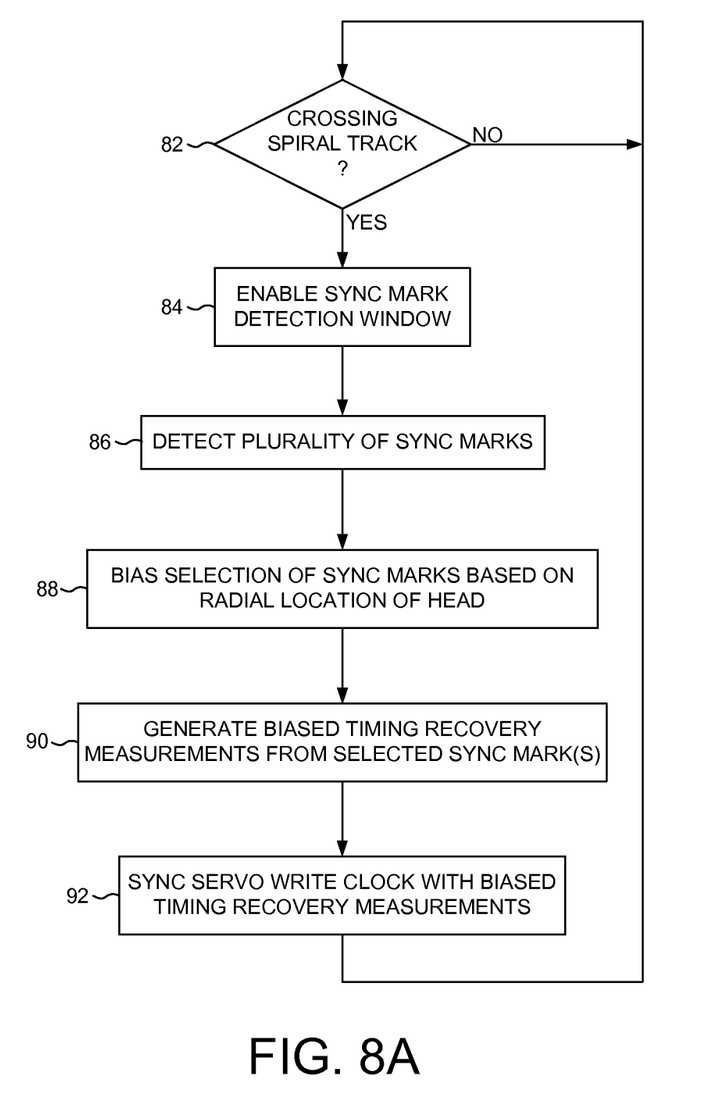
FIG. 8A is a flow diagram according to an embodiment of the present invention wherein the sync marks for generating a biased timing recovery measurement are selected relative to a radial location of the head.

FIG. 8A is a flow diagram according to an embodiment of the present invention wherein for each spiral track crossing a biased timing recovery measurement is generated in response to the sync marks based on a radial location of the head. When the head crosses a spiral track (step 82), the timing recovery circuit 70 enables the sync mark detection window (step 84) during each window where a sync mark 24 is expected to occur. As each sync mark is detected (step 86), one or more of the sync marks is selected to generate a timing recovery measurement based on a radial location of the head (step 88). In an example embodiment shown in FIG. 4B, the early sync marks are selected when the head is located over an inner diameter of the disk and the later sync marks are ignored, and the later sync marks are selected when the head is located over an outer diameter of the disk and the early sync marks are ignored. A biased timing recovery measurement is generated (step 90) based on the selected sync mark(s), and the servo write clock is synchronized in response to the biased timing recovery measurement (step 92).

Figure 8B:
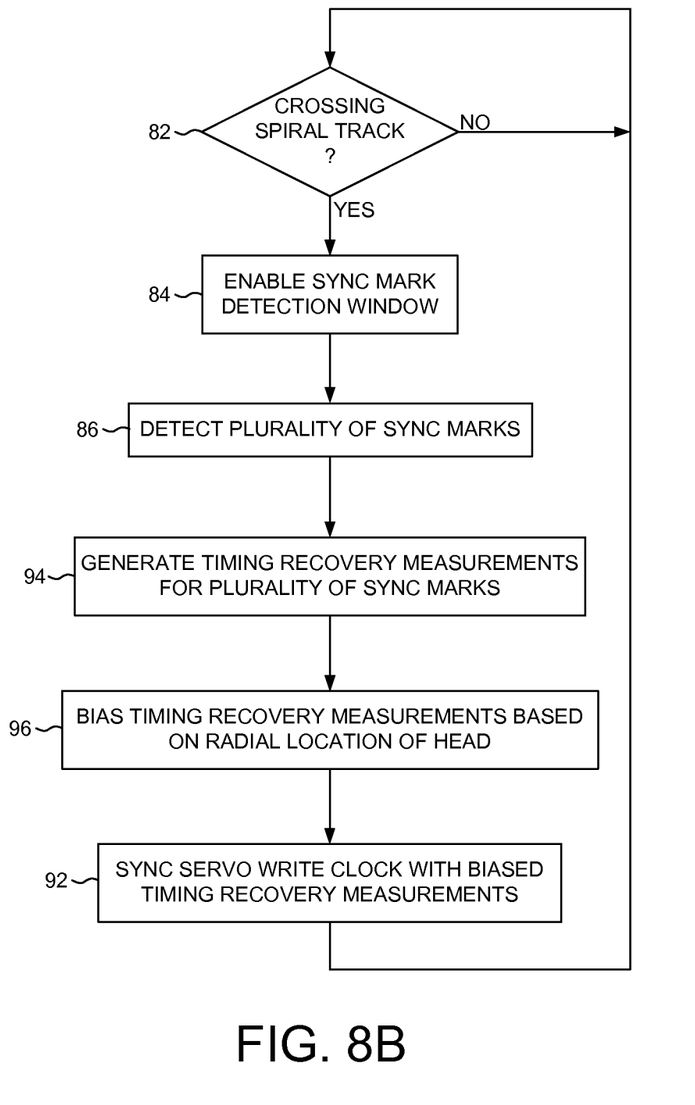
FIG. 8B is a flow diagram according to an embodiment of the present invention wherein the timing recovery measurements generated for each sync mark are biased based on a radial location of the head.

Any suitable technique may be employed to generate the biased timing recovery measurement based on the radial location of the head. In the embodiment of FIG. 8A, a timing recovery measurement is generated only for the selected sync mark(s). In an alternative embodiment shown in the flow diagram of FIG. 8B, a timing recovery measurement is generated for each sync mark in a spiral track crossing (step 94) and the resulting timing recovery measurements are biased to generate the biased timing recovery measurement (step 96).

Figure 9A:
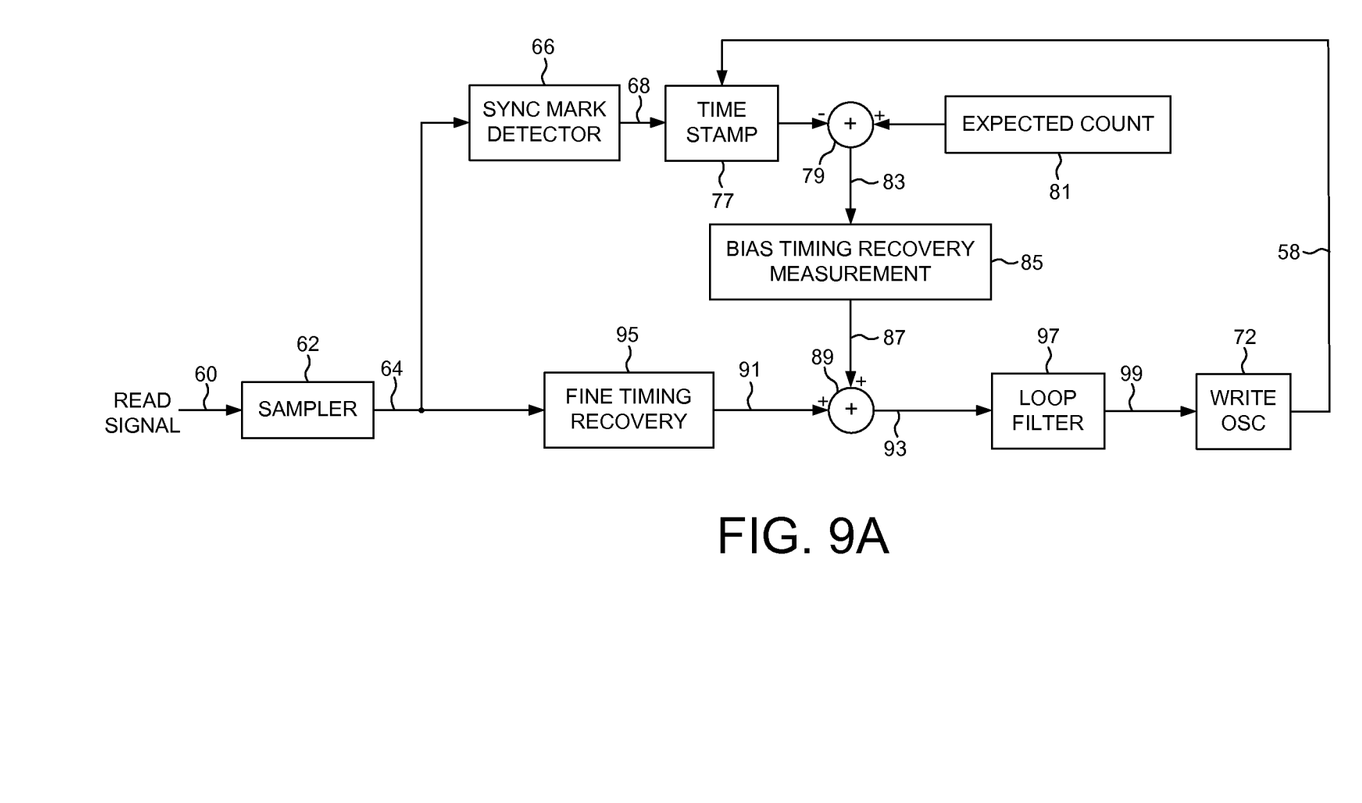
FIG. 9A shows an embodiment of the present invention wherein the timing recovery measurements generated from a plurality of the sync marks are biased to generate a biased timing recovery measurement combined with a fine timing recovery measurement.

This embodiment is further understood with reference to FIG. 9A which shows details of timing recovery circuitry for synchronizing the servo write clock 58. The sync mark detector 66 generates a sync mark detect signal 68 applied to a time stamp circuit 77 comprising the modulo-N counter clocked by the servo write clock 58. The time stamp circuit 77 outputs the value of the modulo-N counter as each sync mark is detected which is subtracted 79 from an expected count 81 to generate the coarse timing recovery measurement 83. The coarse timing recovery measurements 83 are biased 85 to generate a biased timing recovery measurement 87. The biased timing recovery measurement 87 is combined 89 with a fine timing recovery measurement 91 to generate a combined timing recovery measurement 93, wherein the fine timing recovery measurement 91 is generated by a fine timing recovery circuit 95 in response to the read signal samples 64 representing the high frequency signal 22 in the spiral tracks crossing. The combined timing recovery measurement 93 is applied to a suitable PLL loop filter 97, wherein the output 99 of the loop filter 97 is applied to the write oscillator 72 which outputs the servo write clock 58.

Figure 9B:
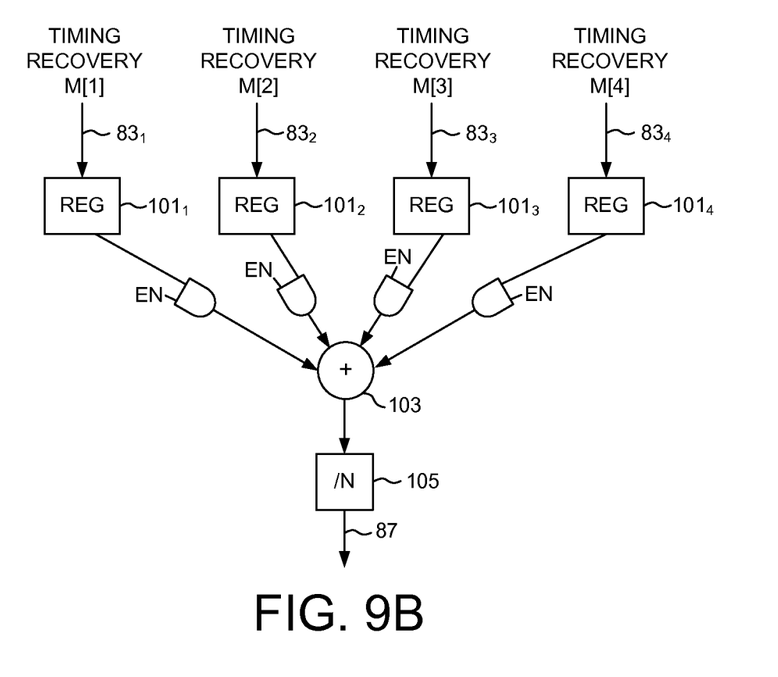
FIG. 9B shows an embodiment of the present invention wherein based on a radial location of the head a select number the timing recovery measurements are averaged.
Figure 9C:
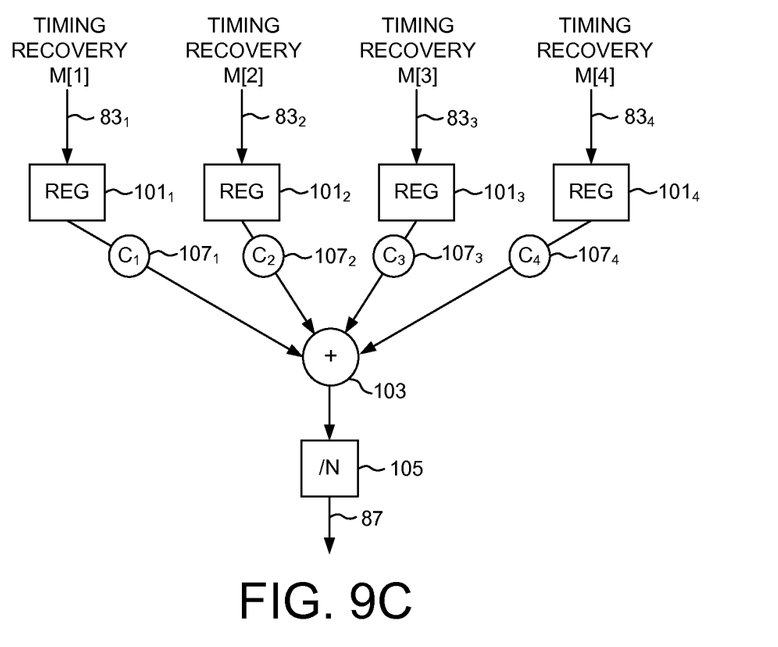
FIG. 9C shows an embodiment of the present invention wherein the timing recovery measurements are weighted and then averaged based on a radial location of the head.

In one embodiment, a biased timing recovery measurement 87 is generated after detecting all of the sync marks in a spiral track crossing and in response to the corresponding coarse timing recovery measurements 83. FIG. 9B shows an embodiment wherein the coarse timing recovery measurements $83_1$-$83_4$ are loaded into respective registers $101_1$-$101_4$, and then a selected number of the timing recovery measurements are enabled by respective AND gates based on the radial location of the head. The selected timing recovery measurements are summed at adder 103, and divided by N at divider 105 to generate an average timing recovery measurement. FIG. 9C shows an alternative embodiment wherein the coarse timing recovery measurements $83_1$-$83_4$ are weighted by respective scalars $107_1$-$107_4$ based on the radial location of the head. For example, the scalars $107_1$-$107_4$ may be increased for the early sync marks when the head is over an inner diameter of the disk, and increased for the later sync marks when the head is over an outer diameter of the disk. In the example embodiments of FIGS. 9B and 9C, the fine timing recovery circuit 95 comprises a suitable delay circuit for delaying the output of the fine timing recovery measurement 91 until the biased timing recovery measurement 87 has been generated for the spiral track crossing.

Figure 10:
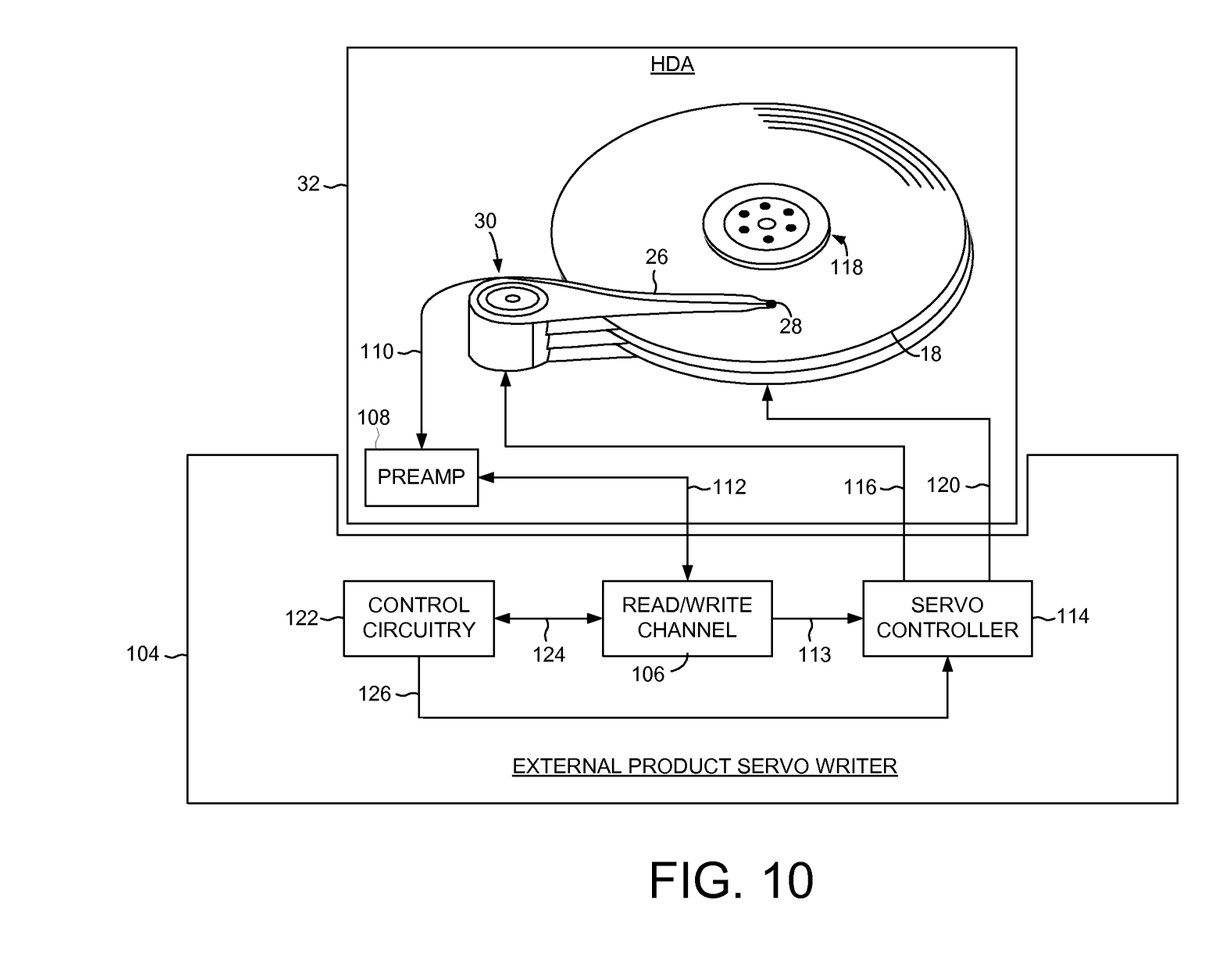
FIG. 10 shows an embodiment of the present invention wherein an external product servo writer is used to process the spiral tracks in order to write the product servo sectors to the disk.
Figure 11:
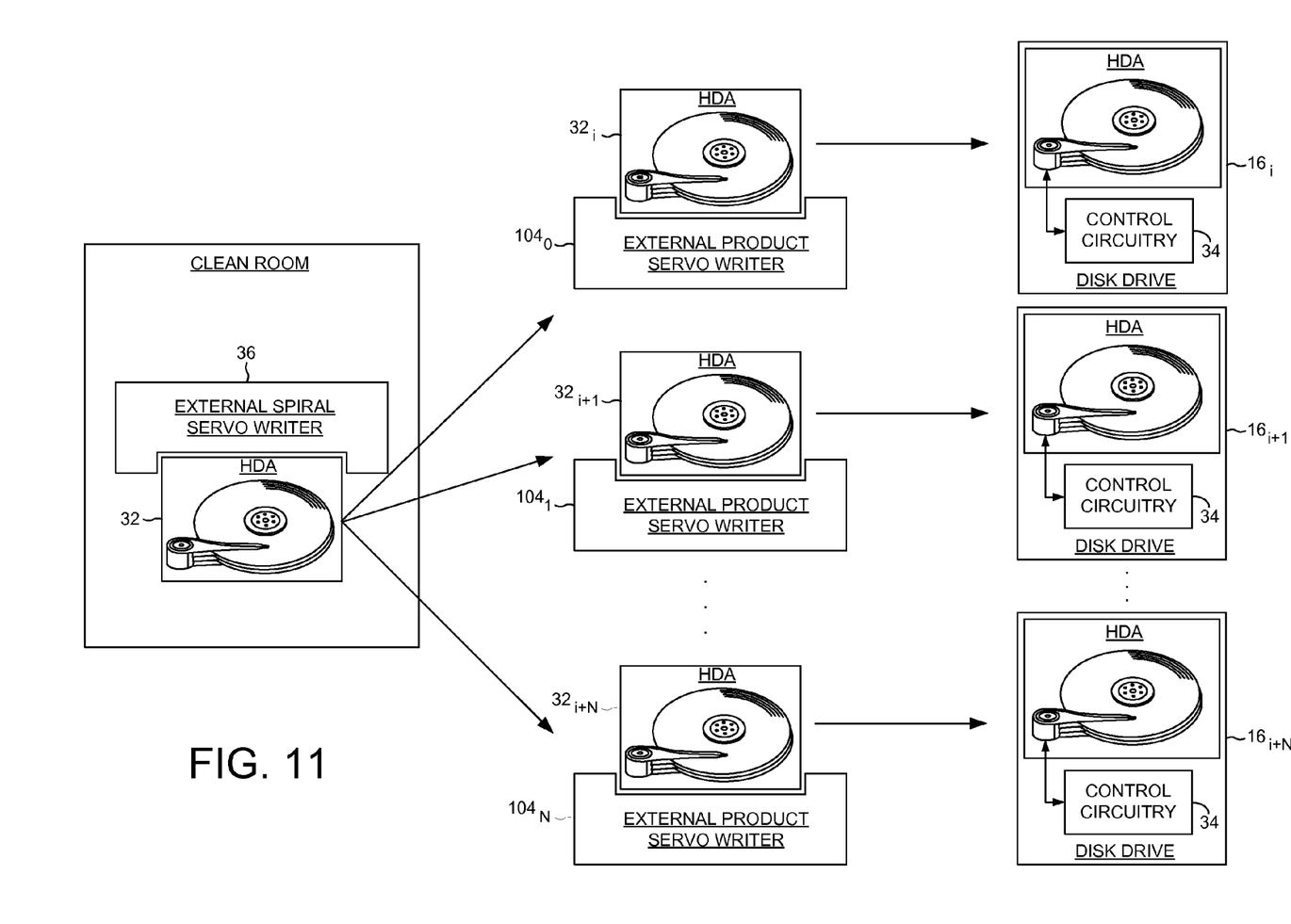
FIG. 11 shows an embodiment of the present invention wherein an external spiral servo writer is used to write the spiral tracks, and a plurality of external product servo writers write the product servo sectors for the HDAs output by the external spiral servo writer.

FIG. 10 shows an embodiment of the present invention wherein after writing the spiral tracks $20_0$-$20_N$ to the disk 18 (FIGS. 2A-2B), the HDA 32 is inserted into an external product servo writer 104 comprising suitable circuitry for reading and processing the spiral tracks $20_0$-$20_N$ in order to write the product servo sectors $56_0$-$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 113 applied to a servo controller 114. The servo controller 114 processes the servo burst signals 113 to generate the PES. The PES is processed to generate a VCM control signal applied to the VCM 30 over line 116 in order to maintain the head 28 along a circular path while writing the product servo sectors $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors $56_0$-$56_N$ to the disk 18. The control circuitry 122 also transmits control information over line 126 to the servo controller 114 such as the target servo track to be written. After writing the product servo sectors $56_0$-$56_N$ to the disk 18, the HDA 32 is removed from the external product servo writer 104 and a printed circuit board assembly (PCBA) comprising the control circuitry 34 (FIG. 2A) is mounted to the HDA 32.

Figure 12:
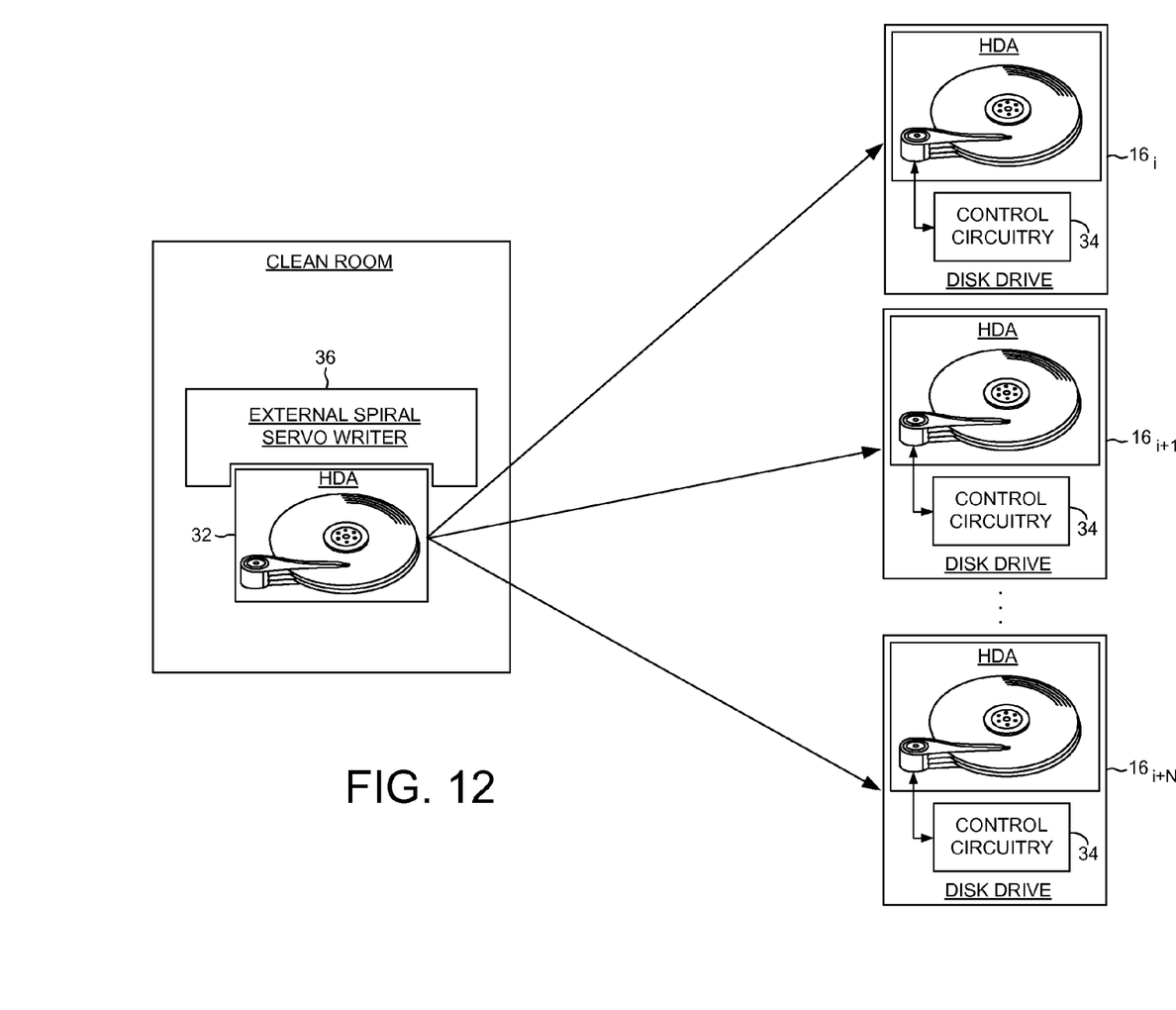
FIG. 12 shows an embodiment of the present invention wherein an external spiral servo writer is used to write the spiral tracks, and the control circuitry within each product disk drive is used to write the product servo sectors.

In one embodiment, the external product servo writer 104 of FIG. 10 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 11, a plurality of external product servo writers $104_0$-$104_N$ process the HDAs $32_{i-i+N}$ output by an external spiral servo writer 36 in order to write the product servo sectors less expensively and more efficiently than a conventional servo writer. In an alternative embodiment shown in FIG. 12, an external spiral servo writer 36 or an external media writer is used to write the spiral tracks, and the control circuitry 34 within each product disk drive $16_0$-$16_N$ is used to write the product servo sectors.

Any suitable control circuitry may be employed to implement the flow diagrams in the embodiments of the present invention, such as any suitable integrated circuit or circuits. In the embodiment wherein the product servo sectors are self-written by each disk drive, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
 a disk comprising a plurality of spiral tracks, each spiral track comprising a high frequency signal interrupted at a predetermined interval by a sync mark;
 a head actuated over the disk; and
 control circuitry operable to:
  use the head to read the spiral tracks to generate a read signal;
  process the read signal to detect a plurality of the sync marks in spiral track crossings;
  generate a plurality of timing recovery measurements corresponding to the plurality of detected sync marks;
  bias the timing recovery measurements based on a radial location of the head over the disk;
  synchronize a servo write clock in response to the biased timing recovery measurements; and
  use the servo write clock and the head to write product servo sectors to the disk.

2. The disk drive as recited in claim 1, wherein biasing the timing recovery measurements comprises weighting each timing recovery measurement.

3. The disk drive as recited in claim 2, wherein biasing the timing recovery measurements comprises weighting each timing recovery measurement based on a radial direction the spiral tracks are written to the disk.

4. The disk drive as recited in claim 3, wherein:
 the spiral tracks are written from an outer diameter of the disk to an inner diameter of the disk; and biasing the timing recovery measurements comprises increasing the weighting of the timing recovery measurements of early sync marks in the spiral track crossing when the head is located over an inner diameter of the disk.

5. The disk drive as recited in claim 3, wherein:
the spiral tracks are written from an outer diameter of the disk to an inner diameter of the disk; and
biasing the timing recovery measurements comprises increasing the weighting of the timing recovery measurements of later sync marks in the spiral track crossing when the head is located over an outer diameter of the disk.

6. The disk drive as recited in claim 3, wherein:
the spiral tracks are written from an inner diameter of the disk to an outer diameter of the disk; and
biasing the timing recovery measurements comprises increasing the weighting of the timing recovery measurements of later sync marks in the spiral track crossing when the head is located over an inner diameter of the disk.

7. The disk drive as recited in claim 3, wherein:
the spiral tracks are written from an inner diameter of the disk to an outer diameter of the disk; and
biasing the timing recovery measurements comprises increasing the weighting of the timing recovery measurements of early sync marks in the spiral track crossing when the head is located over an outer diameter of the disk.

8. The disk drive as recited in claim 2, wherein weighting each timing recovery measurement comprises one of enabling and disabling the timing recovery measurement.

9. The disk drive as recited in claim 2, wherein weighting each timing recovery measurement comprises scaling each timing recovery measurement.

10. The disk drive as recited in claim 1, wherein the control circuitry is further operable to:
average the biased timing recovery measurements to generate an average timing recovery measurement; and
synchronize the servo write clock in response to the average timing recovery measurement.

11. A method of writing product servo sectors to a disk of a disk drive comprising a head actuated over a disk comprising a plurality of spiral tracks, each spiral track comprising a high frequency signal interrupted at a predetermined interval by a sync mark, the method comprising:
using the head to read the spiral tracks to generate a read signal;
processing the read signal to detect a plurality of the sync marks in spiral track crossings;
generating a plurality of timing recovery measurements corresponding to the plurality of detected sync marks;
biasing the timing recovery measurements based on a radial location of the head over the disk;
synchronizing a servo write clock in response to the biased timing recovery measurements; and
using the servo write clock and the head to write product servo sectors to the disk.

12. The method as recited in claim 11, wherein biasing the timing recovery measurements comprises weighting each timing recovery measurement.

13. The method as recited in claim 12, wherein biasing the timing recovery measurements comprises weighting each timing recovery measurement based on a radial direction the spiral tracks are written to the disk.

14. The method as recited in claim 13, wherein:
the spiral tracks are written from an outer diameter of the disk to an inner diameter of the disk; and
biasing the timing recovery measurements comprises increasing the weighting of the timing recovery measurements of early sync marks in the spiral track crossing when the head is located over an inner diameter of the disk.

15. The method as recited in claim 13, wherein:
the spiral tracks are written from an outer diameter of the disk to an inner diameter of the disk; and
biasing the timing recovery measurements comprises increasing the weighting of the timing recovery measurements of later sync marks in the spiral track crossing when the head is located over an outer diameter of the disk.

16. The method as recited in claim 13, wherein:
the spiral tracks are written from an inner diameter of the disk to an outer diameter of the disk; and
biasing the timing recovery measurements comprises increasing the weighting of the timing recovery measurements of later sync marks in the spiral track crossing when the head is located over an inner diameter of the disk.

17. The method as recited in claim 13, wherein:
the spiral tracks are written from an inner diameter of the disk to an outer diameter of the disk; and
biasing the timing recovery measurements comprises increasing the weighting of the timing recovery measurements of early sync marks in the spiral track crossing when the head is located over an outer diameter of the disk.

18. The method as recited in claim 12, wherein weighting each timing recovery measurement comprises one of enabling and disabling the timing recovery measurement.

19. The method as recited in claim 12, wherein weighting each timing recovery measurement comprises scaling each timing recovery measurement.

20. The method as recited in claim 11, further comprising:
averaging the biased timing recovery measurements to generate an average timing recovery measurement; and
synchronizing the servo write clock in response to the average timing recovery measurement.

* * * * *